United States Patent [19]

Beard et al.

[11] Patent Number: 5,261,019
[45] Date of Patent: Nov. 9, 1993

[54] FIBER OPTIC CONNECTOR

[75] Inventors: Michael S. Beard, Eden Prairie; Curtis Puetz, Apple Valley, both of Minn.

[73] Assignee: ADC Telecommunications, Inc., Minneapolis, Minn.

[21] Appl. No.: 816,743

[22] Filed: Jan. 2, 1992

[51] Int. Cl.⁵ .............................................. G02B 6/00
[52] U.S. Cl. ...................................................... 385/60
[58] Field of Search ................... 385/60, 76, 83, 84

[56] References Cited

U.S. PATENT DOCUMENTS

| | | | |
|---|---|---|---|
| 4,422,716 | 12/1983 | Morimoto et al. | 385/76 |
| 4,579,418 | 4/1986 | Parchet et al. | 385/76 |
| 4,738,507 | 4/1988 | Palmquist | 385/76 |
| 4,812,009 | 3/1989 | Carlisle et al. | 385/76 |
| 4,852,963 | 8/1989 | Lampert | 385/76 |
| 5,082,345 | 1/1992 | Cammons et al. | 385/60 |
| 5,096,276 | 1/1992 | Gerace et al. | 385/76 |

FOREIGN PATENT DOCUMENTS 0345519 12/1989 European Pat. Off.

*Primary Examiner*—Akm E. Ullah
*Attorney, Agent, or Firm*—Merchant, Gould, Smith, Edell, Welter & Schmidt

[57] ABSTRACT

A fiber optic connector includes a ferrule assembly having a fiber within a ferrule. The ferrule is received within a hub held in a barrel. An inner spring urges the ferrule and hub outwardly from the barrel. A nut is movably attached to the barrel. An outer spring biases the barrel toward a connector end of a housing.

8 Claims, 2 Drawing Sheets

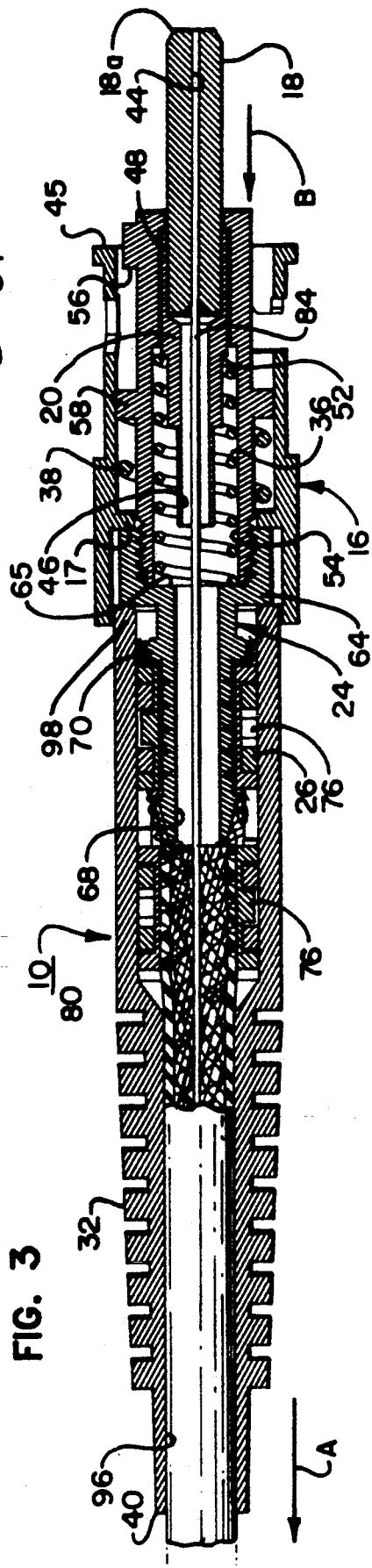

FIBER OPTIC CONNECTOR

I. CROSS-REFERENCE TO RELATED APPLICATION

This application discloses subject matter which is disclosed and claimed in our copending and commonly assigned U.S. Patent Application Serial No. 07/816,105 filed concurrently herewith and entitled "Optical Fiber Retention Mechanism."

II. BACKGROUND OF THE INVENTION

1. Field of the Invention

This invention pertains to fiber optic connectors for use in optical fiber signal transmission systems.

2. Description of the Prior Art

Optical fiber connectors are used to couple optically one optical fiber to another optical fiber or to an optical device. Such connectors are an important part of any optical fiber transmission system and the industry has expended substantial effort in their development.

A commonly available optical connector is referred to as an ST connector (ST is a registered trademark of AT&T). An example of a type of an ST connector is shown in U.S. Pat. No. 4,812,009 dated Mar. 14, 1989.

In installation, an optical fiber connector experiences disruptive forces from time to time. For example, axial loads may be applied to a connector. The axial load may result from a person inadvertently pulling on a cable which is attached to a connector.

If axial loads result in the connector ferrule moving away from an optically coupled opposing ferrule, the optical circuit may be disrupted or disconnected. Accordingly, fiber optic connectors should provide means for preventing disruption of the circuit in response to an axial load applied to the connector.

It is also desirable to provide an optical connector system which can be used interchangeably with an adapter. For example, it is known to use two optical fiber connectors which are joined in optical coupling at an adapter. With certain types of connectors, such as versions of the AT&T ST connector, identical connectors are not utilized on both sides of the adapter. Instead, different connector configurations are used on opposite sides of the adapter with the two configurations cooperating to ensure satisfactory optical coupling.

It is an object of the present invention to provide an optical fiber connector which reduces risk of signal loss in response to axial loads on the connector. It is also an object of the present invention to provide a connector which is symmetrical (i.e., the same connector designed can be used on opposite sides of an adapter coupling).

III. SUMMARY OF THE INVENTION

According to a preferred embodiment of the present invention, an optical fiber connector is disclosed. The connector includes a ferrule assembly including a ferrule having a bore for receiving an optical fiber. The ferrule is received within a hub which is disposed within a barrel. An inner spring is disposed between the hub and the barrel. The inner spring is biased to urge the hub and ferrule outwardly relative to the barrel. A retainer shell is attached to the barrel at a cable entrance end and adapted to receive a portion of a fiber cable. A nut is movably attached to the barrel and surrounds the ferrule/hub/barrel assembly. An outer spring is disposed between the nut and the barrel and biases the barrel toward a connector end of the housing.

IV. BRIEF DESCRIPTION OF THE DRAWINGS

FIG. 2 is a perspective assembled view of the connector of FIG. 1;

FIG. 3 is a cross sectional view taken along a longitudinal axis of the connector assembly according to the present invention.

V. DESCRIPTION OF THE PREFERRED EMBODIMENT

Figure 1:
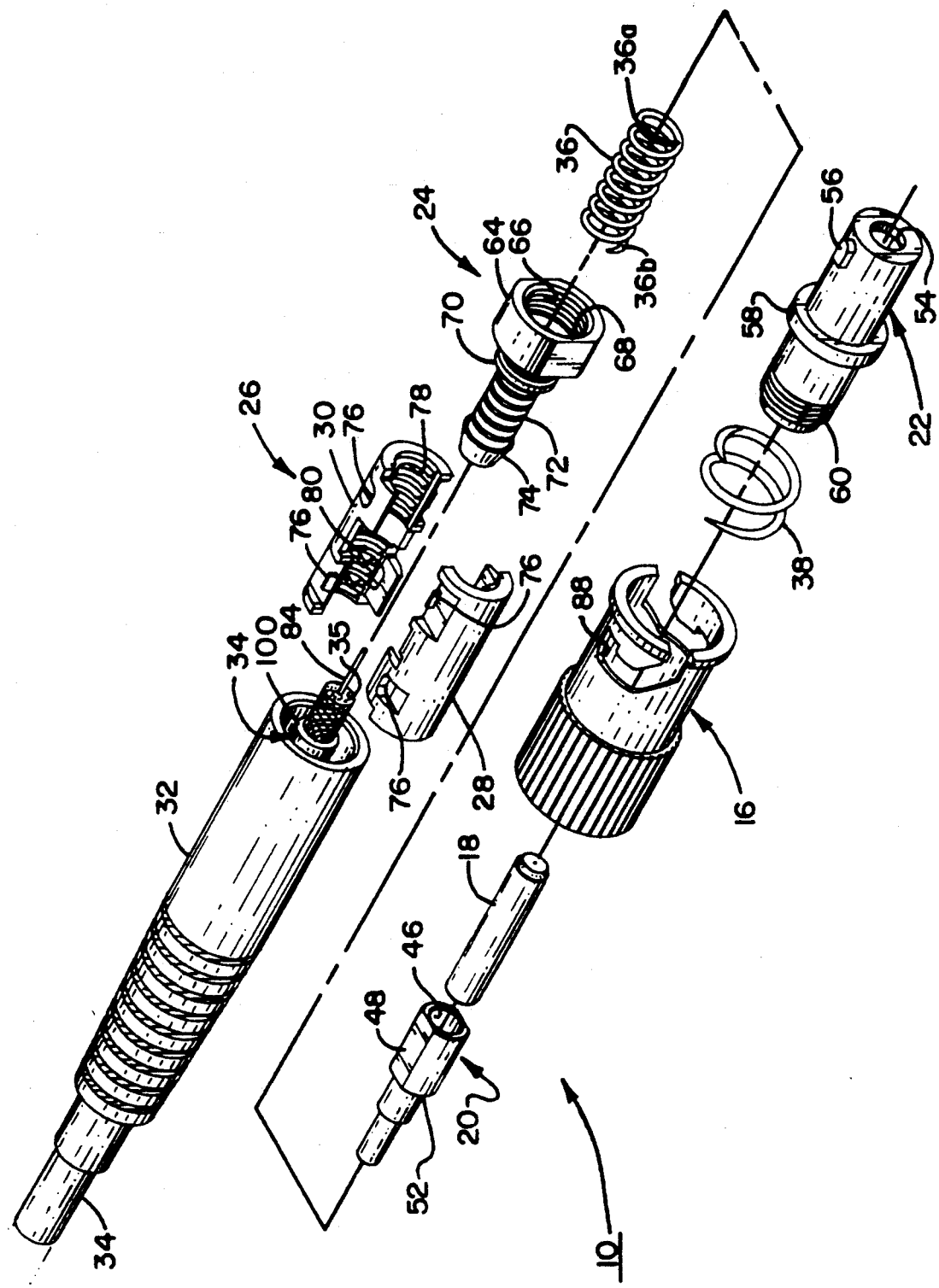
FIG. 1 is an exploded perspective view of a connector according to the present invention.

Referring now to the drawing figures in which similar elements are numbered identically throughout, a description of the preferred embodiment of the present invention will now be provided.

With initial reference to FIG. 3, a connector assembly 10 is shown for connection to an adapter (not shown). A suitable adapter is commercially available and includes a BNC connector end for connection to connector assembly 10. Such an adapter is shown in U.S. Pat. No. 4,812,009 (item 90 in FIG. 2).

The connector 10 is shown in exploded perspective format in FIG. 1. The connector 10 includes a nut coupling 16, a ferrule 18 and a hub 20. Connector 10 also includes a barrel or housing 22, a retaining shell 24 and a retaining clip 26 in the form of mating halves 28,30. Finally, a strain relief boot 32 is provided to give strain relief to a cable 34 secured to connector 10. An inner spring 36 and an outer spring 38 are provided to complete the construction of connector assembly 10.

With reference now to FIG. 3, the connector 10 is shown in longitudinal cross section extending from a cable entrance end 40 to an opposite or termination end 45.

The ferrule 18 is cylindrical and includes an axially extending bore 44 extending through ferrule 18. Hub 20 is also cylindrical and has an axially extending bore 46. The hub 20 includes an attachment end 48 at which bore 46 is enlarged such that ferrule 18 may be press fit within hub 20 and with ferrule bore 44 axially aligned with hub bore 46. The hub 20 has an exterior diameter which is reduced in dimension at an intermediate location. The reduced diameter portion results in the definition of an annular wall 52 facing the cable entrance end 40.

The barrel or housing 22 is also generally cylindrical and includes an axially bore 54 extending therethrough. Axial bore 54 is sized to receive the ferrule 18 and hub 20 to permit the ferrule 18 and hub 20 to axially slidable within bore 54. A key 56 is disposed on the exterior surface of housing 22. The key 56 aligns with a keyway of an adapter (not shown). An annular ring 58 is provided on an intermediate portion of housing 22. An end of housing 22 opposing cable entrance end 40 is provided with external threads 60.

The retaining shell 24 has a hub portion 64 with internal threads 66 sized to be received on external threads 60 of barrel housing 22. The retaining shell 24 also has an interior axial bore 68. Bore 68 is aligned with bores 46 and 44 when threads 66 are threadially engaging threads 60 as shown in FIG. 3.

Spaced from hub 64, an annular ring 70 surrounds shell 24. Shell 24 has a grooved surface 72 which extends from ring 70 to a terminal end 74.

The retaining clip 26 includes first and second mating halves 28,30 which are snap fit together by cooperating snapping locks 76. The retaining clip 26 surrounds surface 72. The mating halves 28,30 include internal annular rings 78 disposed to oppose and be received within grooves 72. Rings 80 are also provided and size to engage a cable 34 received between the mating halves 28,30. Accordingly, the cable 34 is captured by rings 80. Kevlar fibrous reinforcement 35 of the cable 34 is captured between surface 72 and retaining clip 26 (see FIG. 3). The optical fiber 84 passes through bore 68, bore 46 and into bore 44. The fiber 84 is secured within bore 44 through any currently commercially known means. The retaining clip 26 cooperating with retaining shell 24 to securely capture a cable 34 is the claimed subject matter of our commonly assigned and co-pending U.S. patent application Ser. No. 07/816,105, filed concurrently herewith and entitled "Optical Fiber Retention Mechanism". An alternative to using clip 26 is to use a standard crimp to fasten the cable 34 to the connector 10. Crimp connections for fiber optic cables are well known in the art.

The internal spring 36 is provided surrounding hub 20 and having a first end 36a abutting surface 52. A second end 36b abuts an annular wall 65 of hub 64. As hub 64 is threaded onto thread 60, spring 36 is partially compressed to urge hub 20 and ferrule 18 away from cable entrance end 40.

A nut 16 surrounds the housing 22. The nut 16 is similar to item 72 in the aforementioned U.S. Pat. No. 4,812,009. Hub 16 includes a groove 88 to permit attachment to BNC pins of an adapter (not shown). It will be appreciated that nuts such as nut 16 for adaption to a BNC connector form no part of this invention per se. The nut 16 includes an inwardly projecting radial flange 17. External spring 38 is disposed between ring 58 and flange 17.

The strain relief boot 32 has a bore 96 sized to receive cable 34. The boot terminates at an inner end 98 sized to be received over ring 70 and captured on ring 70.

With the structure thus described, the connector 10 can withstand axial loads without disruption of the optical fiber connection. For example, when two connectors 10 are joined on an adapter, the ferrules 18 of the opposing connectors 10 abut one another to further compress spring 36. As shown in FIG. 3, in the rest state, the ferrule and face 18a extends beyond end 45. When two connectors 10 are attached to the adapter, the abutting and faces 18a of the ferrules 18 causes the end face 18a of a ferrule 18 to be urged in a direction indicated by arrow B. When an axial force is applied on the cable 34 in the direction of arrow A in FIG. 3, the force is applied through the retaining shell 24 and further applied to the barrel 22. Accordingly, the barrel 22 will move axially in the direction of arrow A. Due to the force of spring 36, and the slidable connection between the hub 20 and housing 22 the ferrule 18 retains a face-to-face abutting relation with an opposing ferrule 18. As a result, the optical connection is not disrupted.

The foregoing detailed description of the present invention has been shown how the objects of the invention have been attained in a preferred manner. However, modifications and equivalents of the disclosed concepts are intended to be included within the scope of the present invention.

What is claimed is:

1. An optical fiber connector for connecting one optical fiber to another optical fiber, said connector comprising:
   first and second ferrule assemblies having a longitudinal axis extending from a cable entrance end to an opposite end, each of which includes a ferrule having a bore therethrough and being adapted to terminate an optical fiber disposed in said bore, housing means connected to at least a portion of said ferrule, each of said ferrule assemblies including first biasing means for biasing said ferrule outwardly along said longitudinal axis from said cable, said first biasing means including an elongated hub disposed within said housing means and having one end adapted for securely receiving said ferrule and a first spring means disposed and biased to urge said hub toward said opposite end;
   attachment means for attachment to and substantially enclosing each of said ferrule assemblies;
   coupling means for releasably receiving a free end of each of said ferrules and adapted to retain said free ends in optical alignment;
   means for permitting limited movement of said housing along said longitudinal axis when said attachment means is secured to the coupling means wherein said first biasing means maintains said optical alignment, said means for permitting limited movement of said housing means including a second spring means positioned to urge said housing means towards said opposite end.

2. An optical fiber connector according to claim 1 wherein said means for permitting limited movement of the housing means further includes a first abutment surface connected to an inner surface of said attachment means and a second abutment surface connected to an outer surface of said housing means wherein said second spring means is disposed about the outer surface of said housing means between said first and second abutment surfaces.

3. An optical fiber connector according to claim 1 wherein each of said ferrule assemblies includes retention means attached to said housing means at the cable entrance end of said ferrule assemblies for securely attaching an optical fiber cable to the ferrule assembly.

4. An optical fiber connector according to claim 3 wherein said retention means includes a connecting member securely attached to said housing means and having an axially-extending bore therethrough for receiving the optical fiber and a fiber cable retention mechanism, said retention mechanism including a sleeve assembly having a longitudinal axis, said assembly having first and second opposing sleeve members, said sleeve members each having an inner accurate surface cooperating to define a passageway through said assembly sized to receive a portion of said connecting member, said assembly further including means for connecting said first sleeve member to said second sleeve member to securely retain an end of said cable and the connecting member within said inner passageway of the sleeve assembly.

5. An optical fiber connector according to claim 4 wherein said connecting means includes at least one male and one female fastening portion integrally formed on each of said sleeve members such that the female portion of each sleeve member engages the male portion of the other sleeve member to lock the sleeve members together such that said inner arcuate surfaces of the sleeve members enclose the cable end and the connecting member disposed within said passageway of the sleeve assembly.

6. An optical fiber connector according to claim 4 wherein said inner arcuate surfaces of the sleeve members include arcuate rib segments extending radially inwardly into said passageway and sized to contact and compress an outer jacket of the fiber cable disposed in said passageway such that the fiber cable is prevented from moving longitudinally with respect to the sleeve assembly.

7. An optical fiber connector according to claim 6 wherein said connecting member is provided with annular grooves of predetermined dimension therein and said arcuate rib segments of said sleeve members are positioned at spaced intervals such that when a portion of the fiber cable is disposed about an outer surface of said annular grooves, said rib segments of the sleeve members are received in said grooves with the cable portion compressed between said ribs and grooves to prevent longitudinal movement of the fiber cable and the connecting member with respect to the sleeve assembly.

8. An optical fiber connector according to claim 4 wherein said cylindrical connecting member includes a surface enlargement and wherein said inner arcuate surfaces of the sleeve members include a channel adapted for receiving said enlargement to retain the connecting member within the sleeve assembly.

* * * * *

UNITED STATES PATENT AND TRADEMARK OFFICE
CERTIFICATE OF CORRECTION

PATENT NO. : 5,261,019

DATED : November 9, 1993

INVENTOR(S) : Michael S. Beard et al.

It is certified that error appears in the above-identified patent and that said Letters Patent is hereby corrected as shown below:

Column 4, line 53 "accurate" should read --arcuate--.

Signed and Sealed this

Twenty-fourth Day of May, 1994

*Attest:*

BRUCE LEHMAN

*Attesting Officer*     *Commissioner of Patents and Trademarks*